(12) United States Patent
Cheng et al.

(10) Patent No.: US 8,766,947 B2
(45) Date of Patent: Jul. 1, 2014

(54) TOUCH PANEL AND DIFFERENTIAL DETECTION METHOD FOR SAME

(75) Inventors: Chien-Yung Cheng, Miao-Li County (TW); Po-Sheng Shih, Miao-Li County (TW); Po-Yang Chen, Miao-Li County (TW)

(73) Assignee: Innolux Corporation, Miao-Li County (TW)

( * ) Notice: Subject to any disclaimer, the term of this patent is extended or adjusted under 35 U.S.C. 154(b) by 600 days.

(21) Appl. No.: 13/044,560

(22) Filed: Mar. 10, 2011

(65) Prior Publication Data

US 2011/0227863 A1 Sep. 22, 2011

(30) Foreign Application Priority Data

Mar. 17, 2010 (CN) .......................... 201010126242.7

(51) Int. Cl.
*G06F 3/045* (2006.01)
(52) U.S. Cl.
USPC ........................................ 345/174; 178/18.06
(58) Field of Classification Search
USPC ...................... 345/173–184; 178/18.01–20.04
See application file for complete search history.

(56) References Cited

U.S. PATENT DOCUMENTS

| 6,075,520 | A  | * | 6/2000  | Inoue et al. ................... 345/173 |
| 6,538,706 | B2 |   | 3/2003  | Sun |
| 8,232,970 | B2 | * | 7/2012  | Krah et al. ..................... 345/173 |
| 2008/0309632 | A1 | * | 12/2008 | Westerman et al. ........... 345/173 |
| 2009/0079707 | A1 | * | 3/2009  | Kaehler et al. ................ 345/174 |
| 2009/0315858 | A1 | * | 12/2009 | Sato et al. ...................... 345/174 |
| 2010/0134422 | A1 | * | 6/2010  | Borras ........................... 345/173 |
| 2011/0032196 | A1 | * | 2/2011  | Feng et al. ..................... 345/173 |
| 2011/0073383 | A1 | * | 3/2011  | Simmons ................... 178/18.06 |
| 2011/0157068 | A1 | * | 6/2011  | Parker et al. .................. 345/174 |
| 2011/0157070 | A1 | * | 6/2011  | Martin et al. ................. 345/174 |
| 2011/0291977 | A1 | * | 12/2011 | Moriwaki .................... 345/173 |

FOREIGN PATENT DOCUMENTS

| CN | 1797308 A | 7/2006 |
| CN | 101493742 A | 7/2009 |

* cited by examiner

*Primary Examiner* — Amare Mengistu
*Assistant Examiner* — Vinh Lam
(74) *Attorney, Agent, or Firm* — Bacon & Thomas, PLLC

(57) ABSTRACT

A touch panel and a differential detection method thereof are disclosed. A controller provides a driving signal to the i-th scan electrode. During providing the driving signal to the i-th scan electrode, the controller senses the feature difference value between two neighboring sensing electrodes within the plural sensing electrodes, and senses the feature difference value $\Delta C_i$ between the k-th sensing electrode within the sensing electrodes and a reference feature value, in which the feature difference values between the j-th sensing electrode and the (j+1)-th sensing electrode is represented by $\Delta C(i,j)$. The controller set the feature value of a base sensing point within a plurality of sensing points of the touch panel as a base feature value, and use the base feature value, the feature difference values $\Delta C_i$ and the feature difference values $\Delta C(i,j)$ to calculate the feature values of the sensing points.

21 Claims, 8 Drawing Sheets

| | S1 | S2 | S3 | S4 | S5 | S6 | S7 | S8 | S9 |
|---|---|---|---|---|---|---|---|---|---|
| D12 → | 1055 | 1017 | 986 | 1114 | 1127 | 1097 | 1077 | 990 | 1010 |
| D11 → | 1055 | 1031 | 996 | 1132 | 1154 | 1107 | 1077 | 990 | 1010 |
| D10 → | 1059 | 1032 | 996 | 1120 | 1152 | 1103 | 1074 | 984 | 1010 |
| D9 → | 1067 | 1035 | 1000 | 1118 | 1146 | 1100 | 1069 | 982 | 1011 |
| D8 → | 1073 | 1039 | 1004 | 1114 | 1142 | 1096 | 1147 | 983 | 1014 |
| D7 → | 1142 | 1113 | 1107 | 1210 | 1236 | 1193 | 1308 | 1065 | 1048 |
| D6 → | 1215 | 1230 | 1314 | 1320 | 1347 | 1385 | 1169 | 1181 | 1112 |
| D5 → | 1110 | 1100 | 1131 | 1133 | 1159 | 1217 | 1045 | 1115 | 1066 |
| D4 → | 1041 | 1048 | 1039 | 1033 | 1059 | 1049 | 1040 | 1033 | 1034 |
| D3 → | 1030 | 1042 | 1034 | 1028 | 1049 | 1043 | 1043 | 1029 | 1030 |
| D2 → | 1024 | 1035 | 1030 | 1027 | 1049 | 1043 | 1040 | 1029 | 1026 |
| D1 → | 1023 | 1033 | 1032 | 1025 | 1046 | 1042 | 990 | 1031 | 1023 |

FIG. 6

| 1055 | 1023 | 1023 | 1112 | 1104 | 1078 | 1110 | 1031 | 1023 | ← D12 |
|------|------|------|------|------|------|------|------|------|-------|
| 1055 | 1037 | 1033 | 1130 | 1131 | 1088 | 1110 | 1031 | 1023 | ← D11 |
| 1059 | 1038 | 1033 | 1118 | 1129 | 1084 | 1107 | 1025 | 1023 | ← D10 |
| 1067 | 1041 | 1037 | 1116 | 1123 | 1081 | 1102 | 1023 | 1024 | ← D9 |
| 1073 | 1045 | 1041 | 1112 | 1119 | 1077 | 1180 | 1024 | 1027 | ← D8 |
| 1142 | 1119 | 1144 | 1208 | 1213 | 1174 | 1341 | 1106 | 1061 | ← D7 |
| 1215 | 1236 | 1351 | 1318 | 1324 | 1366 | 1202 | 1222 | 1125 | ← D6 |
| 1110 | 1106 | 1168 | 1131 | 1136 | 1198 | 1078 | 1156 | 1079 | ← D5 |
| 1041 | 1054 | 1076 | 1031 | 1036 | 1030 | 1073 | 1074 | 1047 | ← D4 |
| 1030 | 1048 | 1071 | 1026 | 1026 | 1024 | 1076 | 1070 | 1043 | ← D3 |
| 1024 | 1041 | 1067 | 1025 | 1026 | 1024 | 1073 | 1070 | 1039 | ← D2 |
| 1023 | 1039 | 1069 | 1023 | 1023 | 1023 | 1023 | 1072 | 1036 | ← D1 |
| ↑ | ↑ | ↑ | ↑ | ↑ | ↑ | ↑ | ↑ | ↑ | |
| S1 | S2 | S3 | S4 | S5 | S6 | S7 | S8 | S9 | |

FIG. 7

TOUCH PANEL AND DIFFERENTIAL DETECTION METHOD FOR SAME

BACKGROUND OF THE DISCLOSURE

1. Field of the Disclosure

The disclosure generally relates to a touch panel, and more particularly, to a differential detection method of a touch panel.

2. Description of Related Art

In recent years, various electronic products have been developed towards operation convenience, small volume and large screen size, so that many electronic products adopt touch panels to save the keyboard or manipulating key, which further makes the disposable area expanded. The most common touch panels currently can be roughly divided into various modes of touch panels: resistive, capacitive, infrared and ultrasonic. A traditional touch panel requires at least two indium tin oxide films (ITO films) so as to respectively measure touch positions in X and Y directions. According to the touch technique of a traditional capacitive touch panel, four-corner connection electrodes at the ITO film of the capacitive touch panel with applied certain electric signals are used. When a finger touches any point on the capacitive touch panel, the finger would take away the charges coupled onto the capacitive touch panel so that the currents of the four-corner connection electrodes are changed. By detecting the energy variation and the difference thereof on the above-mentioned four-corner connection electrodes, the capacitive touch panel can judge the touch behaving and the touch position. However, the conventional capacitive touch panel only judges the touch behaving of a single point.

SUMMARY

Accordingly, the disclosure is directed to a differential detection method of a touch panel, which can precisely detect the coordinate information of a single point, two points or even more touch points.

The disclosure provides a differential detection method of a touch panel, in which the touch panel has a plurality of scan electrodes and a plurality of sensing electrodes respectively along a first axial direction and a second axial direction. The differential detection method includes following steps: selecting the i-th scan electrode within the scan electrodes so as to provide a driving signal to the i-th scan electrode; during providing the driving signal to the i-th scan electrode, sensing the feature difference value $\Delta C(i,j)$ between the j-th sensing electrode within the sensing electrodes and another neighbouring sensing electrode and sensing the feature difference value $\Delta Ci$ between the k-th sensing electrode within the sensing electrodes and a reference feature value, the above-mentioned i, j and k are integers; setting the feature value of a base sensing point within a plurality of sensing points of the touch panel as a base feature value; and using the base feature value, the feature difference values $\Delta Ci$ and the feature difference values $\Delta C(i,j)$ to calculate the feature values of the sensing points.

The disclosure provides a touch panel, which includes a first conductive layer, a second conductive layer, a plurality of scan electrodes, a plurality of sensing electrodes and a controller. The scan electrodes are disposed at a side of the first conductive layer along a first axial direction and the sensing electrodes are disposed at a side of the second conductive layer along a second axial direction. The controller selects the i-th scan electrode within the scan electrodes so as to provide a driving signal to the i-th scan electrode. During providing the driving signal to the i-th scan electrode, the controller senses the feature difference value $\Delta C(i, j)$ between the j-th sensing electrode within the sensing electrodes and another neighbouring sensing electrode and senses the feature difference value $\Delta Ci$ between the k-th sensing electrode within the sensing electrodes and a reference feature value. The controller sets the feature value of a base sensing point within a plurality of sensing points of the touch panel as a base feature value, and the controller uses the base feature value, the feature difference values $\Delta Ci$ and the feature difference values $\Delta C(i,j)$ to calculate the feature values of the sensing points.

In an embodiment of the disclosure, the above-mentioned step of calculating feature values of a plurality of sensing points of the touch panel includes: calculating $\Delta C[i]=\Delta Ci-\Delta C(i+1)$, wherein $\Delta C[i]$ represents the feature difference value between the i-th scan electrode and the (i+1)-th scan electrode; if the base sensing point is located at the j-th row, using the base feature value to calculate $C(i+1,j)=C(i,j)-\Delta C[i]$ or $C(i-1,j)=C(i,j)+\Delta C[i]$, wherein $C(i,j)$ represents the feature value of the sensing point with the i-th column and the j-th row within the sensing points; and calculating $C(i,j+1)=C(i,j)-\Delta C(i,j)$ or $C(i,j-1)=C(i,j)+\Delta C(i,j)$.

In an embodiment of the disclosure, the above-mentioned differential detection method of a touch panel further includes: calculating the difference between the minimum feature value within the feature values of all the sensing points on the i-th scan line and the base feature value and taking the difference as a compensation value; and adjusting the feature values of all the sensing points on the i-th scan line according to the compensation value.

In an embodiment of the disclosure, the above-mentioned differential detection method of a touch panel further includes: calculating an average feature value of all the sensing points on the i-th scan line; calculating the difference between the average feature value and the base feature value and taking the difference as a compensation value; and adjusting the feature values of all the sensing points on the i-th scan line according to the compensation value.

In an embodiment of the disclosure, the above-mentioned step of sensing the feature difference value $\Delta Ci$ includes: sensing the feature difference value $\Delta Ci$ between the k-th sensing electrode and a dummy sensing electrode of the touch panel.

In an embodiment of the disclosure, the above-mentioned step of sensing the feature difference value $\Delta Ci$ comprises: sensing the feature difference value $\Delta Ci$ between the k-th sensing electrode and a reference capacitor.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

FIG. 6 is a diagram giving out the feature values of all the sensing points of a touch panel according to an embodiment of the disclosure.

FIG. 7 is a diagram showing all the corrected feature values of FIG. 6 according to an embodiment of the disclosure.

DESCRIPTION OF EMBODIMENTS

Figure 1:
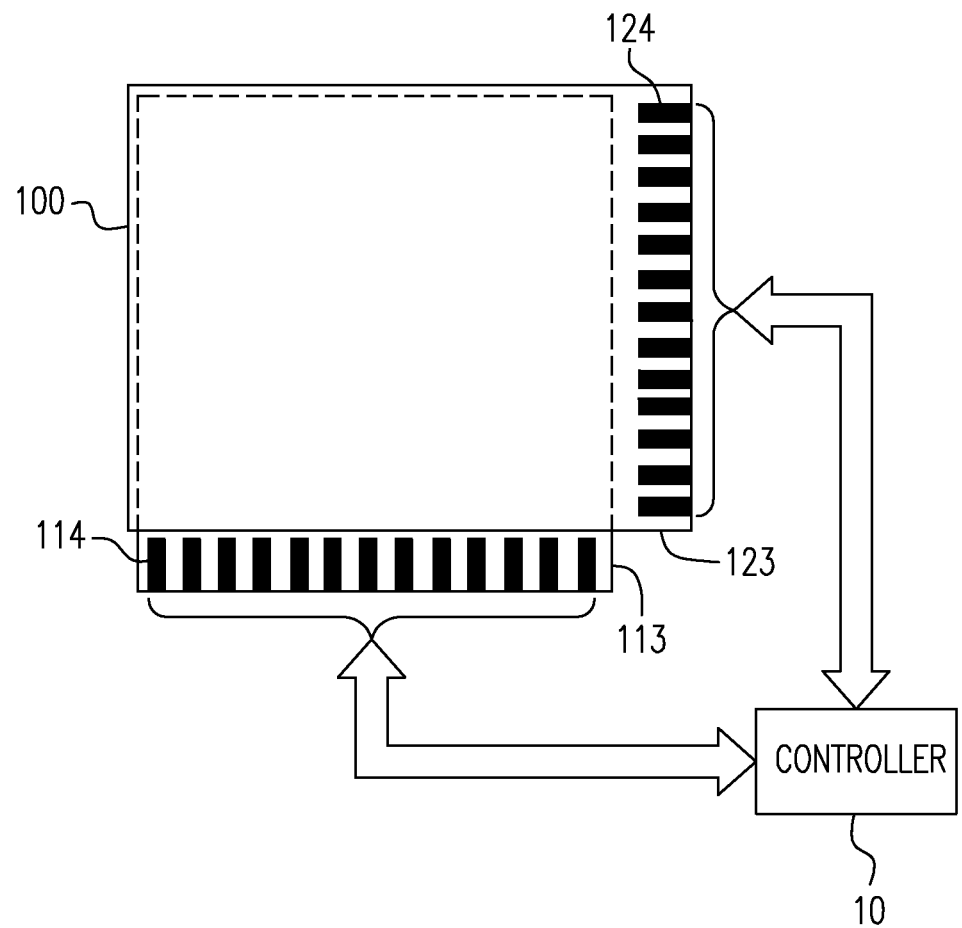
FIG. 1 is a function block diagram of a touch panel according to an embodiment of the disclosure.

Reference will now be made in detail to the preferred embodiments of the disclosure, examples of which are illustrated in the accompanying drawings. Wherever possible, the same reference numbers are used in the drawings and the description to refer to the same or like parts.

The touch panel detected by the following embodiments can be any touch panel such as capacitive touch panel, resistive touch panel or touch panel having carbon nanotube film (CNT film). The touch panel has a plurality of scan electrodes and a plurality of sensing electrodes respectively along a first axial direction and a second axial direction (for example, X direction and Y direction, which the disclosure is not limited to). In addition, based on the type of the detected touch panel, the feature values to be detected are different. In order to more concretely describe the feasible embodiment, in following, a capacitive touch panel is taking as an example and a capacitance value serves as the feature value to be detected. Anyone skilled in the art can deduct the instruction of the following embodiments to other types of touch panel. In fact, in addition to the capacitance value, the feature value to be detected can be current value or voltage value.

Figure 2:
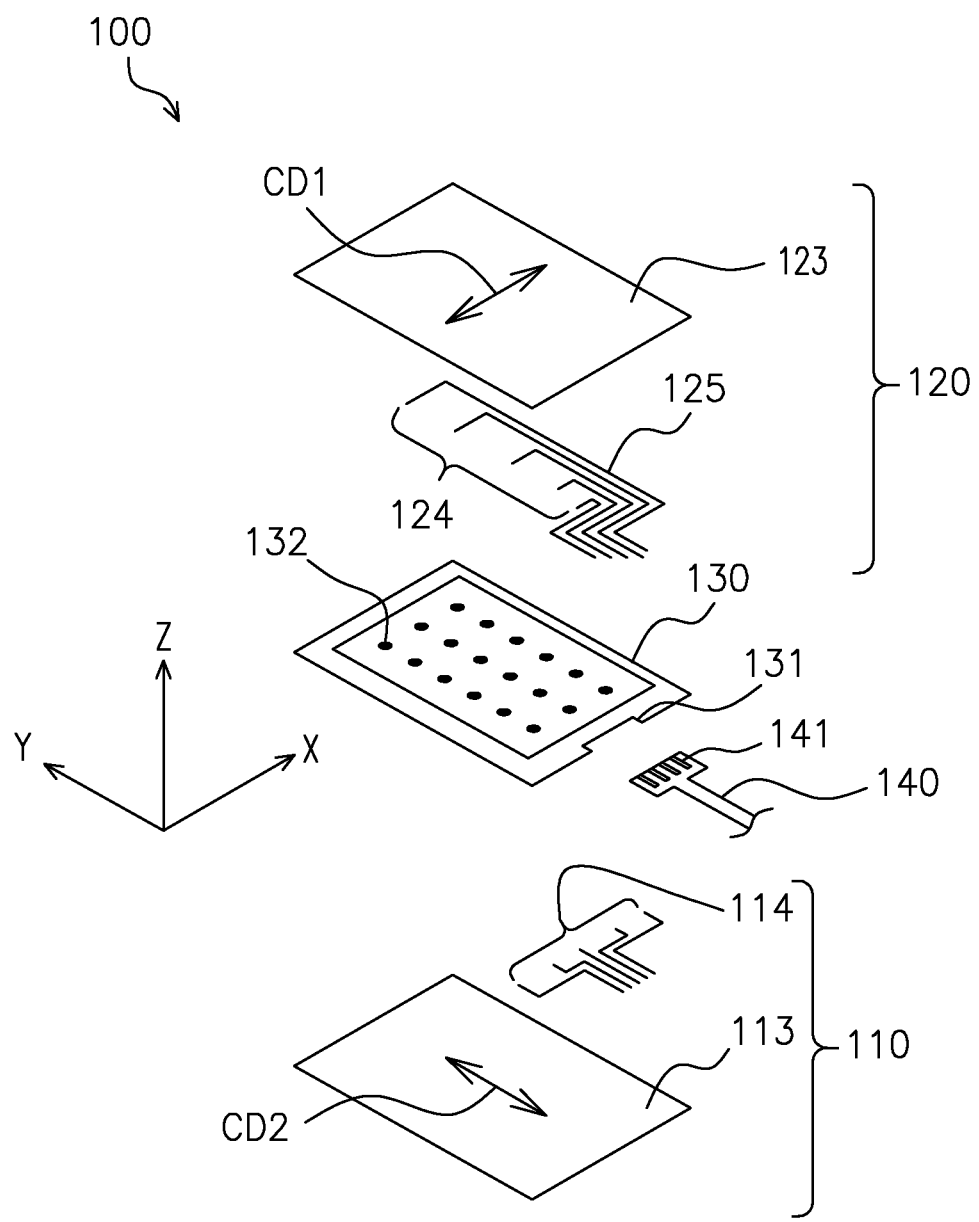
FIG. 2 is a combination diagram of the touch panel of FIG. 1 according to an embodiment of the disclosure.

FIG. 1 is a function block diagram of a touch panel 100 according to an embodiment of the disclosure and FIG. 2 is a combination diagram of the touch panel 100 of FIG. 1 according to an embodiment of the disclosure. In FIG. 2, a Cartesian coordinate system is introduced, which includes an X direction, a Y direction and a Z direction perpendicular to each other. For simplifying the figures and the depiction, the first electrodes 114 and the second electrodes 124 in FIG. 2 are respectively shown by five electrodes. In a real application, the numbers of the first electrodes 114 and the second electrodes 124 can be determined according to the area of the real touch panel and the application field.

As shown by FIG. 2, the touch panel 100 is formed by superposing a first conductive film 110 and a second conductive film 120. An insulating layer structure is disposed between the first conductive film 110 and the second conductive film 120. The insulating layer structure can be a ring-shape glue layer 130 shown in FIG. 2 or other structures. The first conductive film 110 and the second conductive film 120 are fixed to each other by adhering the ring-shape glue layer 130. There are a plurality of insulation spacers 132 evenly distributed between the first conductive film 110 and the second conductive film 120 so that the two conductive films 110 and 120 keep a fixed interval.

The first conductive film 110 includes a first conductive layer 113 and the first electrodes 114, in which a plurality of first electrodes 114 are disposed at a side of the first conductive layer 113 along a first axial direction (for example, the X direction). The intervals between the first electrodes 114 are equal and the first electrodes 114 are respectively electrically connected to the first conductive layer 113; the ends of the first electrodes 114 extend to the center lower-edge of the first conductive film 110 for transmitting signals to outside.

The second conductive film 120 includes a second conductive layer 123 and the second electrodes 124, in which a plurality of second electrodes 124 are disposed at a side of the second conductive layer 123 along a second axial direction (for example, the Y direction). The intervals between the second electrodes 124 are equal and the second electrodes 124 are respectively electrically connected to the second conductive layer 123; the second electrodes 124 are connected to a plurality of connection lines 125 arranged in parallel at the right side of the second conductive film 120, the connection lines 125 extend along the right side edge of the second conductive layer 123, and the ends of the connection lines 125 extend to the center lower-edge of the second conductive film 120 for transmitting signals to outside.

In addition, the touch panel 100 further includes a flexible printed circuit board 140 which has a plurality of metal bonding points 141. There is a notch 131 at the center of the lower-edge of the ring-shape glue layer 130. During assembling, the notch 131 is corresponding to the flexible printed circuit board 140. The metal bonding points 141 on the upper surface and the lower surface of the flexible printed circuit board 140 are electrically connected to the ends of all the connection lines on the first conductive film 110 and the second conductive film 120, so that the external electric signals can be transmitted to the first electrodes 114 of the first conductive layer 113 and the second electrodes 124 of the second conductive layer 123.

In a preferred embodiment, the ring-shape glue layer 130 used by the touch panel 100 of the embodiment of the disclosure can be thermosetting glue or UV curing glue. In order to increase the reliability of the touch panel 100 and reduce the side frame width of the touch panel 100, the first conductive layer 113 and the second conductive layer 123 in the embodiment are composed of carbon nanotube film. The carbon nanotube film is conductive and fabricated by drawing a super vertical-aligned carbon nanotube array, which can be used to fabricate transparent conductive film, During the drawing process, since the carbon nanotubes in a long chain shape are arranged in parallel roughly along the drawing direction, so that in the drawing direction, the carbon nanotube film has lower impedance, and along the direction perpendicular to the drawing direction, the carbon nanotube film has higher impedance, which is roughly 50-350 times than the impedance along the drawing direction. Besides, the surface resistance would be 1KΩ and 800KΩ depending on different measuring positions and different directions. In short, the first conductive layer 113 and the second conductive layer 123 have anisotropic conductivity.

As shown by FIG. 2, in the embodiment of the disclosure, the first conductive layer 113 has a primary conductive direction CD1 (the drawing direction of the original conductive film) and the second conductive layer 123 has another primary conductive direction CD2. In the embodiment, the primary conductive direction CD1 (i.e., the low impedance direction) of the first conductive layer 113 is perpendicular to the primary conductive direction CD2 of the second conductive layer 123. For example, the low impedance direction CD2 of the second conductive layer 123 is X direction and the low impedance direction CD1 of the first conductive layer 113 is Y direction. The impedances in the direction perpendicular to the primary conductive direction of the first conductive layer 113 and the second conductive layer 123 are roughly 100-200 times than the impedances in the primary conductive directions CD1 and CD2.

As shown by FIG. 1, a controller 10 is electrically connected to the first electrodes 114 and the second electrodes 124. During detecting the touch position in the Y direction, the first electrodes 114 serve as scan electrodes, so that the controller 10 simultaneously provides a driving signal (for example, a logic high-level) to all the first electrodes 114, and during providing the driving signal to all the first electrodes 114; during providing the driving signal to all the first electrodes, the controller 10 senses the feature value (for example, capacitance value, resistance value or voltage value) of every second electrode 124 one by one. After that, the controller 10 simultaneously provides the driving signal to all the second electrodes 124, and during providing the driving signal to all the second electrodes 124, the controller 10 senses the feature value of every first electrode 114 one by one. When the controller 10 completes the above-mentioned sensing, the coordinate information in X and Y directions of the touch point is obtained.

For depiction simplicity, the following embodiment takes, for example, two touch points to describe the operation of the touch panel 100. In fact, the multi-point differential detection method of the touch panel in the embodiment of the disclosure can be suitable to more touch points.

Figure 3:
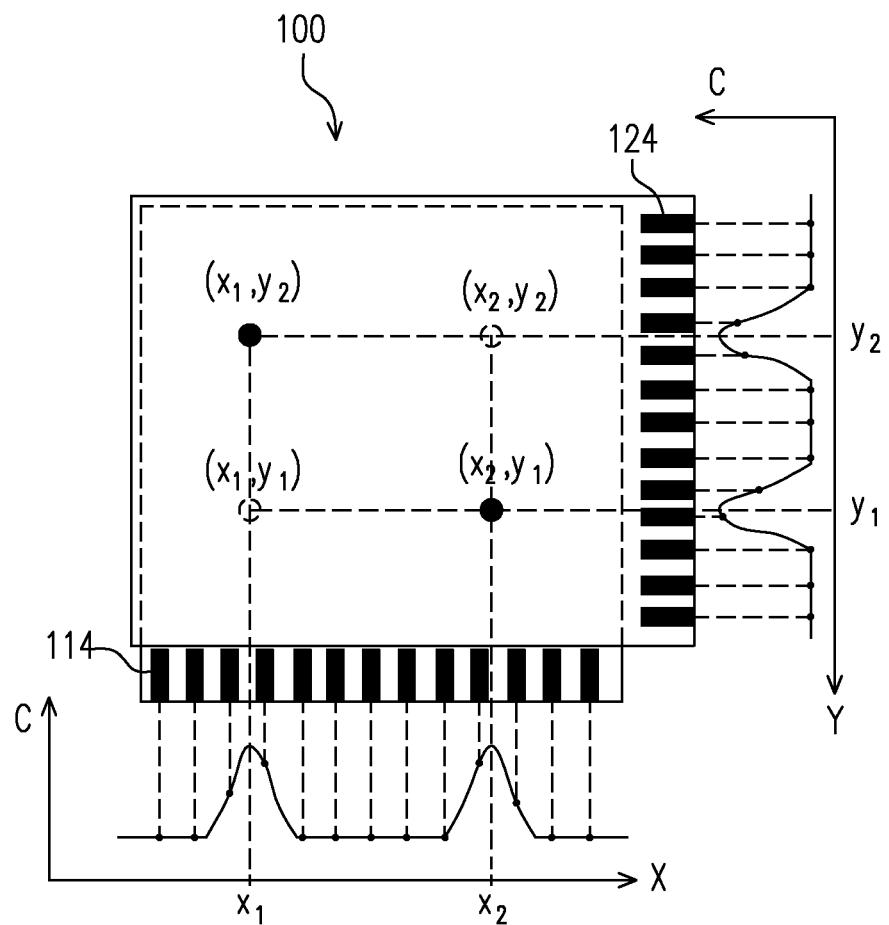
FIG. 3 is a diagram showing the differential detection method of the touch panel of FIG. 2 according to an embodiment of the disclosure.

FIG. 3 is a diagram showing the differential detection method of the touch panel 100 of FIG. 2 according to an embodiment of the disclosure. Assuming there are two touch points on the touch panel 100, they have coordinates (x1, y2) and (x2, y1). The controller 10 performs the above-mentioned operation, simultaneously provides a driving signal to all the first electrodes 114 and senses the capacitance value of every second electrode 124. The Y coordinates y2 and y1 of the touch points can be obtained by the capacitance values of all the second electrodes 124. Then, the controller 10 performs the above-mentioned operation, simultaneously provides the driving signal to all the second electrodes 124 and senses the capacitance value of every first electrode 114. The X coordinates x1 and x2 of the touch points can be obtained by the capacitance values of all the first electrodes 114. After completing the above-mentioned sensing operation, the controller 10 can obtain the coordinate information in X and Y directions of the two touch points. However, the sensing method has a ghost point problem and a signal masking problem. For example, the controller 10 is unable to identify whether the coordinates of the two touch points are (x1, y2) and (x2, y1) or (x1, y1) and (x2, y2).

Figure 4:
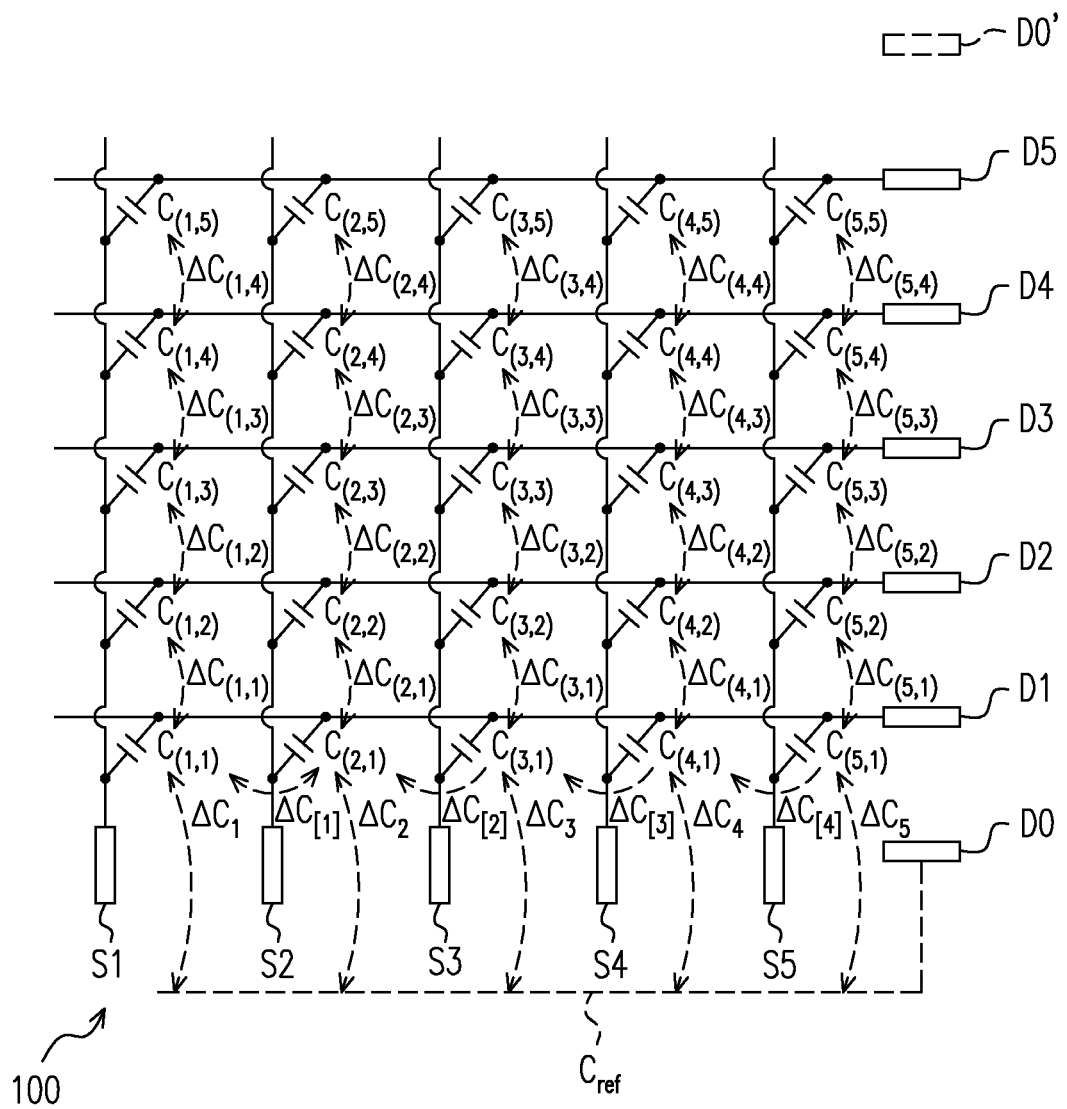
FIG. 4 is a diagram of the touch panel of FIG. 1 according to an embodiment of the disclosure.

FIG. 4 is a diagram of the touch panel 100 of FIG. 1 according to an embodiment of the disclosure. For figure and depiction simplicity, in FIG. 4, the scan electrodes S1-S5 and the sensing electrodes D1-D5 respectively represent the first electrodes 114 and the second electrodes 124, but in a real application, the numbers of the scan electrodes and the sensing electrodes are determined by the area of the real touch panel and the application requirement. By means of the anisotropic conductivity the first conductive layer 113 and the second conductive layer 123 in FIG. 2 have, the scan electrodes S1-S5 are respectively equivalent to an electrode electrically connected to a corresponding scan line; the sensing electrodes D1-D5 are respectively equivalent to an electrode electrically connected to a corresponding sensing line. At every intersected place between the scan lines and the sensing lines, a sensing capacitance is formed, and each sensing capacitance can serve as a sensing point, as shown by FIG. 4.

Figure 5:
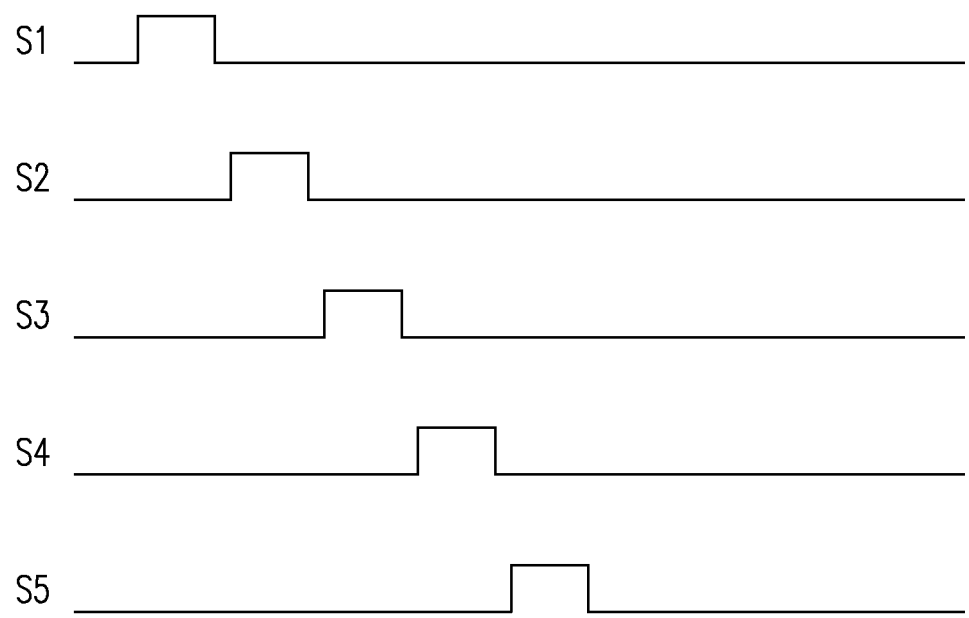
FIG. 5 is a diagram showing a timing relation of the driving signal provided by the scan electrodes S1-S5 in FIG. 4 according to an embodiment of the disclosure.

During the detection process, the scan electrodes S1-S5 would be in turn selected once a time and provided with a driving signal. The next scan electrode within the scan electrodes S1-S5 can be selected in sequence or in staggered way. For example, S1, S3 and S5 are scanned first, followed by scanning S2, S4, . . . . The scanning sequence can be also S3, S2, S4, 51, S5. In other embodiments, the driving sequence of the scan electrodes S1-S5 can be any regular sequence or irregular sequence. For example, the driving sequence is determined stochastically or in any other manners. In the embodiment, the driving sequence of the scan electrodes S1-S5 is sequentially determined. FIG. 5 is a diagram showing a timing relation of the driving signal provided by the scan electrodes S1-S5 in FIG. 4 according to an embodiment of the disclosured. That is to say, firstly, the i-th scan electrode Si within the scan electrodes S1-S5 is selected and Si is provided with a driving signal; then, the (i+1)-th scan electrode S(i+1) within the scan electrodes S1-S5 is selected and S(i+1) is provided with a driving signal. The above-mentioned i is an integer.

During providing the driving signal to the i-th scan electrode Si, the controller 10 uses a differential amplifier to sense the feature difference value $\Delta C(i, j)$ between the j-th sensing electrode Dj within the sensing electrodes D1-D5 and another neighbouring sensing electrode and uses a differential amplifier to sense the feature difference value $\Delta Ci$ between the k-th sensing electrode Dk within the sensing electrodes D1-D5 and a reference feature value Cref, in which j and k are integers. The above-mentioned "neighbouring two sensing electrodes" can be two adjacent sensing electrodes, for example, by sensing the j-th sensing electrode Dj and the (j+1)-th sensing electrode D(j+1) to obtain feature difference value $\Delta C(i,j)$. The "neighbouring two sensing electrodes" can also be two sensing electrodes but they are spaced by one, two or more sensing electrodes. For example, by sensing the j-th sensing electrode Dj and (j+2)-th sensing electrode D(j+2), the feature difference value $\Delta C(i,j)$ is obtained. In the embodiment, the above-mentioned feature difference value $\Delta C(i,j)$ means the feature difference value between the j-th sensing electrode Dj and the (j+1)-th sensing electrode D(j+1) within the sensing electrodes D1-D5, and the feature difference value can be capacitance difference value. In order to sense the above-mentioned feature difference value of neighbouring two sensing electrodes within the sensing electrodes D1-D5, once a pair of sensing electrodes are used to sense the feature difference value $\Delta C(i,j)$ of the neighbouring two sensing electrodes or the sensing operation of all the above-mentioned feature difference values are simultaneously accomplished.

For example, assuming "k-th sensing electrode" is D1, that is, the controller 10 uses the differential amplifier to senses the feature difference value between the edge sensing electrode D1 within the sensing electrodes D1-D5 and a reference feature value Cref. During providing the driving signal to the first scan electrode S1, the controller 10 uses the differential amplifier to sense the feature difference value $\Delta C(1, 1)$ between the neighbouring sensing electrodes D1 and D2, the feature difference value $\Delta C(1, 2)$ between the sensing electrodes D2 and D3, the feature difference value $\Delta C(1, 3)$ between the sensing electrodes D3 and D4, the feature difference value $\Delta C(1, 4)$ between the sensing electrodes D4 and D5, and uses the differential amplifier to sense the feature difference value $\Delta C1$ between the first sensing electrodes D1 and a reference feature value Cref. The above-mentioned reference feature value Cref is provided by a dummy sensing electrode D0 disposed on the touch panel 100. That is to say, during providing the driving signal to the first scan electrode S1, the differential amplifier senses the feature difference value $\Delta C1$ between the first sensing electrode D1 and the dummy sensing electrode D0 disposed on the touch panel 100. In the embodiment, the above-mentioned dummy sensing electrode D0 is not connected to a sensing line as an entity. The person using the embodiment can determine the connection architecture of the dummy sensing electrode D0 according to the design requirement. For example, the dummy sensing electrode D0 can be connected to a special line (for example, a ground line). In other embodiments, the above-mentioned dummy sensing electrode D0 may not be disposed on the touch panel 100, and the above-mentioned reference feature value Cref can be provided by a reference capacitor disposed outside the touch panel 100. At the point, the controller 10 uses the differential amplifier to sense the feature difference value ΔC1 between the first sensing electrode D1 and the reference capacitor.

Next, during providing the driving signal to the second scan electrode S2, the differential amplifier senses the feature difference value ΔC(2,1) between the neighbouring two sensing electrodes D1 and D2, the feature difference value ΔC(2, 2) between the two sensing electrodes D2 and D3, the feature difference value ΔC(2,3) between the neighbouring two sensing electrodes D3 and D4, the feature difference value ΔC(2, 4) between the neighbouring two sensing electrodes D4 and D5 and the feature difference value ΔC2 between the first sensing electrode D1 and the reference feature value Cref, and analogically for the rest, to obtain the feature difference values ΔC(3,1)–ΔC(3,4), ΔC(4,1)–ΔC(4,4), ΔC(5,1)–ΔC(5, 4) and the feature values ΔC3, ΔC4 and ΔC5.

It should be noted that the above-mentioned "k-th sensing electrode" can be determined in any way according to the design requirement. Taking FIG. 4 as an example, the "k-th sensing electrode" can be D5 or other sensing electrodes. That is to say, any sensing electrode can be selected within the sensing electrodes D1-D5 according to the design requirement to detect the feature difference values ΔC1–ΔC5. In addition, the position of the above-mentioned dummy sensing electrode D0 is not limited to the one shown by FIG. 4. The position of the dummy sensing electrode D0 is determined according to the design requirement, for example, the position of the dummy sensing electrode D0' in FIG. 4 or other any positions.

The above-mentioned feature difference values ΔC1–ΔC5 can be converted into the information of another axial direction. For example, it is calculated ΔC [i]=ΔCi–ΔC(i+1), in which ΔC[i] represents the feature difference value between the i-th scan electrode Si and the (i+1)-th scan electrode S(i+1). Referring to FIG. 4, since ΔC1=C(1,1)–Cref, and ΔC2=C(2,1)–Cref, so that the feature difference value between the first scan electrode 51 and the second scan electrode S2 is ΔC[1]=C(1,1)–C(2,1)=ΔC1–ΔC2. Analogically for the rest, the feature difference values ΔC[2] until ΔC[4] can be calculated.

The values obtained by the above-mentioned detection are relative feature values. In order to obtain the feature values of all sensing points, any one of plural sensing points in the touch panel 100 can be selected to serve as a base sensing point, and the feature value of the base sensing point is in advance set as a base feature value. Next, by using the base feature value, the feature difference values ΔC1 until ΔC5, the feature difference values ΔC(1,1) until ΔC(1,4), the feature difference values ΔC(2,1) until ΔC(2,4), the feature difference values ΔC(3,1) until ΔC(3,4), the feature difference values ΔC(4,1) until ΔC(4,4) and the feature difference values ΔC(5,1) until ΔC(5,4), the feature values of all the sensing points are calculated.

If the base sensing point is located at the j row, then, the base feature value is used to calculate C(i+1,j)=C(i,j)–ΔC[i] (or calculate C(i–1,j)=C(i,j)+ΔC[i]), in which C(i,j) represents the feature value of the sensing point with the i-th column and the j-th row within the sensing points. For example, assuming the feature value of an untouched sensing point is C0 and the sensing point with the first column and the first row (i.e., C(1,1) as shown in FIG. 4) is selected as a base sensing point, then, the feature value C(1,1) of the base sensing point is set as C0 (i.e., the base feature value). Since ΔC(1,1)=C(1,1)–C(1,2), so that the feature value C(2,1)=C(1,1)–ΔC[1]=C0–ΔC[1]. Analogically for the rest, the feature values C(3,1), C(4,1) and C(5,1) can be calculated.

After that, by calculating C(i,j+1)=C(i,j)–ΔC(i,j) (or C(i, j–1)=C(i,j)+ΔC(i,j)), the feature values of other sensing points are obtained. For example, referring to FIG. 4, since the feature difference values ΔC(1,1)=C(1,1)–C(1,2), so that the feature value C(1,2)=C(1,1)–ΔC(1,1)=C0–ΔC(1,1). Analogically for the rest, the feature values C(1,3), C(1,4) and C(1,5) can be obtained. Similarly, by using the feature values C(2,1), C(3,1), C(4,1) and C(5,1) and using the feature values ΔC(2,1) until ΔC(2,4), the feature values C(3,1) until ΔC(3, 4), the feature values C(4,1) until ΔC(4,4) and the feature values C(5,1) until ΔC(5,4), the feature values of other sensing points can be obtained.

After obtaining the feature values of all sensing points, it can be decided which sensing point or which sensing points are the touch points. For example, the feature values of all sensing point are compared with a threshold, and the sensing point with the feature value over the threshold can be decided as a touch point. If within the sensing points, for example, the feature value of a sensing point (termed as a first sensing point) is greater than the feature values of all sensing points adjacent to the first sensing point, the first sensing point is decided as a touch point. Since the differential detection method disclosed by the embodiment adopts the all-plane scanning way, the method can precisely detect the coordinate information of a single point, two points or even more touch points on the touch panel without ghost-point problem.

The above-mentioned embodiment can be performed in a modified way according to the design requirement. Taking FIG. 4 as an example, the above-mentioned "k-th sensing electrode" can be D3. That is to say the sensing electrode D3 is selected to detect the feature difference values ΔC1 until ΔC5. Assuming the sensing point with the third column and the third row (i.e., the place with C(3, 3) in FIG. 4) is selected as the base sensing point, the feature value C(3,3) of the base sensing point is set as the base feature value C0. According to the above-mentioned assumption, the following feature values can be calculated: C(4,3)=C0–ΔC[3], C(5,3)=C(4,3)–ΔC [4], C(2,3)=C0+ΔC[2] and C(1,3)=C(2,3)+ΔC[1]. Then, the following feature values are calculated: C(3,4)=C0–ΔC(3,3), C(3,5)=C(3,4)–ΔC(3,4), C(3,2)=C0+ΔC(3,2) and C(3,1)=C (3,2)+ΔC(3,1). The feature values of other sensing points can be deducted, which is omitted to describe.

Depending on different real application conditions, after the above-mentioned embodiment calculates the feature values of all sensing points, the method goes to a correction step. For example, after finding out the minimum feature value within the feature values of all the sensing points on the i-th scan line Si, the difference between the minimum feature value and the base feature value C0 is calculated and the difference is taken as a compensation value Coffset. Then, the feature values of all the sensing points on the i-th scan line Si are adjusted according to the compensation value Coffset.

FIG. 6 is a diagram giving out the feature values of all the sensing points of a touch panel according to an embodiment of the disclosure. The touch panel has 9 scan lines (i.e., 9 scan electrodes S1-S9) and 12 sensing lines (i.e., 12 sensing electrodes D1-D12). Assuming there are two touch points in the embodiment, the positions thereof are respectively located at the intersected place between the scan line S3 and the sensing line D6 and the intersected place between the scan line S6 and the sensing line D6. Assuming the base feature value C0 is 1023 and the sensing point at the intersected place between the scan line S1 and the sensing line D1 is selected as the base sensing point. By using the above-mentioned differential detection method, the feature values of all sensing points on the touch panel 100 can be calculated, as shown by FIG. 6. From the feature values shown by FIG. 6, a relative maximum value at the intersected place between the scan line S6 and the sensing line D6 is found, and the sensing point can be seen as a touch point. However, another touch point may not be detected due to the errors of the above-mentioned plural feature difference values.

Thus, the feature values of the sensing points in FIG. 6 need to be corrected. FIG. 7 is a diagram showing all the corrected feature values of FIG. 6 according to an embodiment of the disclosure. For example, after finding out the minimum feature value within the feature values of all the sensing points on the second scan line S2 is 1017, the difference between the minimum feature value and the base feature value C0 is calculated and the difference is taken as a compensation value Coffset, i.e., Coffset=1023−1017=6. Then, the feature values of all the sensing points on the scan line S2 are adjusted according to the compensation value Coffset, i.e., the feature values of all sensing points on the scan line S2 are respectively added by 6. Analogically for the rest, the feature values of all sensing points on the each line are corrected so as to obtain the corrected feature values as shown by FIG. 7. From the feature values of FIG. 7, two relative maximum values can be found, which are respectively at the intersected place between the scan line S6 and the sensing line D6 and the intersected place between the scan line S3 and the sensing line D6. As a result, after the correction, the positions of the two touch points can be precisely detected.

The feature values shown by FIG. 6 can be corrected by using other correction method according to the design requirement. For example, an average feature value of the feature values of all sensing points on the i-th scan line Si is calculated; then, the difference between the average feature value and the base feature value C0 is calculated and the difference is taken as a compensation value Coffset; finally, the feature values of all the sensing points on the i-th scan line Si are adjusted according to the compensation value Coffset. For example, the average feature value of the feature values of all sensing points on the second scan line S2 is calculated by: (1039+1041+1048+1054+1106+1236+1119+1045+1041+1038+1037+1023)/12=1069. Then, the difference between the average feature value and the base feature value C0 is calculated and the difference is taken as a compensation value Coffset, i.e., Coffset=1023−1069=−46. After that, the feature values of all the sensing points on the scan line S1 are adjusted according to the compensation value Coffset, i.e., the feature values of all the sensing points on the scan line S1 are respectively added by (−46). Analogically for the rest, the corrections of the feature values on other scan lines are omitted to describe.

Although the above-mentioned embodiment takes capacitance value as the feature value to be detected, but the disclosure is not limited to the implementation. For example, a resistance value can serve as a feature value to be detected. When an external object such as a finger or a touch pen presses the touch panel 100, the first conductive layer 113 and/or the second conductive layer 123 of FIG. 2 would produce a local deformation due to the press force applied by the external object, which makes the first conductive layer 113 and the second conductive layer 123 electrical contacted by each other at the press position. As a result, the controller 10 can perform the differential detection method to calculate the resistance values of all the sensing points on the touch panel 100. Furthermore, the method can precisely detect the coordinate information of a single point, two points or even more touch points on the touch panel 100.

Figure 8:
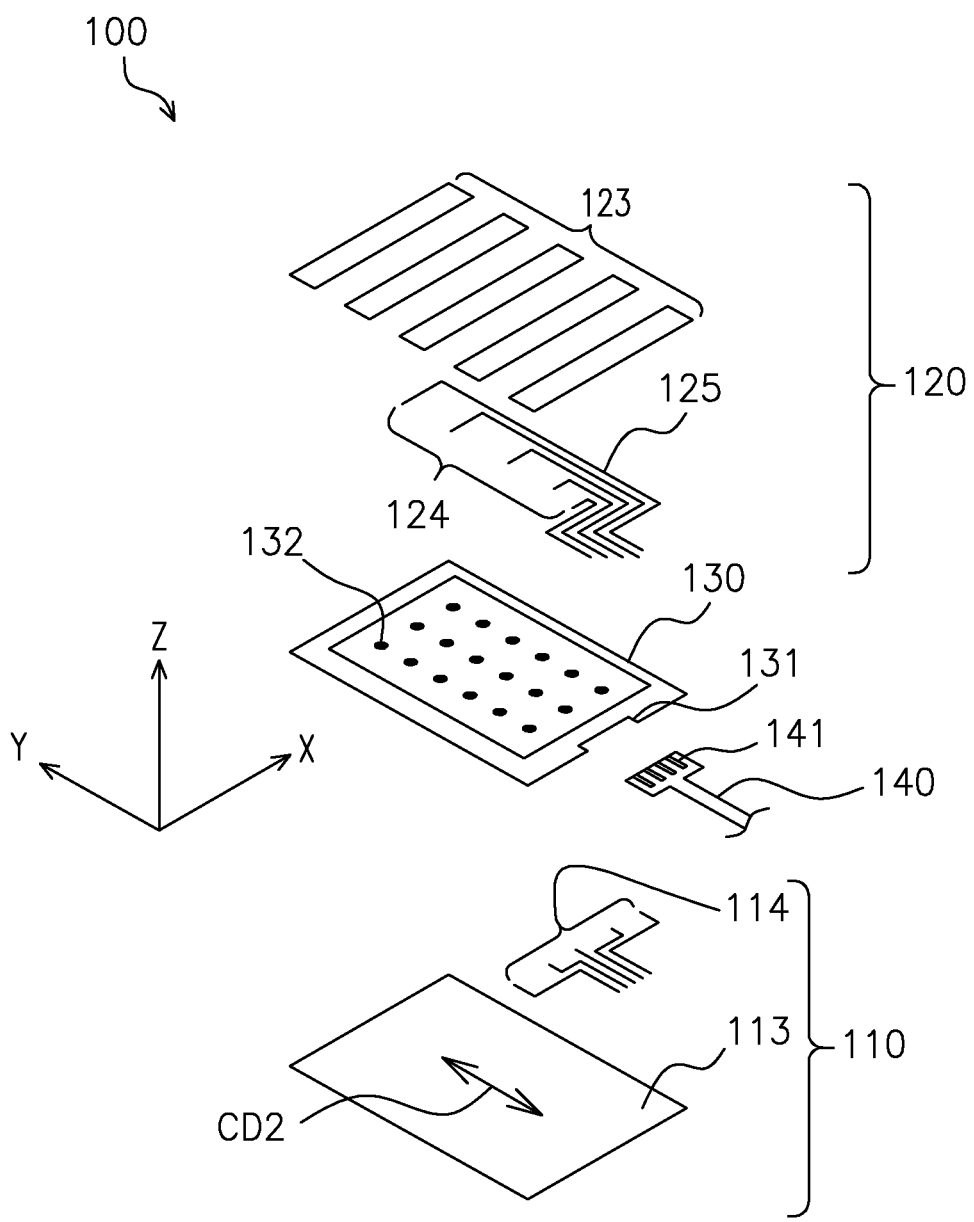
FIG. 8 is a combination diagram of the touch panel of FIG. 1 according to another embodiment of the disclosure.

It should be noted that the above-mentioned can be applied to any form of touch panel, not limited to the touch panel 100 of FIG. 2. FIG. 8 is a combination diagram of the touch panel 100 of FIG. 1 according to another embodiment of the disclosure. The most structures of the touch panel 100 shown by FIG. 8 are similar to the touch panel 100 of FIG. 2, except that the second conductive layer 123 of the touch panel 100 in FIG. 8 is a patterned ITO film layer (or other transparent conductive materials). The second conductive layer 123 has a plurality of sensing lines. In FIG. 8, the second conductive layer 123 has five sensing lines as an example. The controller 10 is electrically connected to all sensing lines through the second electrodes 124. A plurality of sensing capacitances are formed between each sensing line and the first conductive layer 113, in which each sensing capacitance serves as a sensing point, as shown by FIG. 4. Thus, the touch panel 100 of FIG. 8 can use the above-mentioned differential detection method to detect the coordinate information of a single point, two points or even more touch points on the touch panel 100.

In summary, the differential detection method disclosed by the above-mentioned embodiments adopts the all-plane scanning way and can calculate the feature value of every sensing point, so that the method can precisely detect the coordinate information of a single point, two points or even more touch points on the touch panel without ghost-point problem.

It will be apparent to those skilled in the art that the descriptions above are several preferred embodiments of the disclosure only, which does not limit the implementing range of the disclosure. Various modifications and variations can be made to the structure of the disclosure without departing from the scope or spirit of the disclosure.

What is claimed is:

1. A differential detection method of a touch panel, wherein the touch panel has a plurality of scan electrodes and a plurality of sensing electrodes respectively along a first axial direction and a second axial direction; the differential detection method comprising:

selecting the i-th scan electrode within the scan electrodes so as to provide a driving signal to the i-th scan electrode, wherein i is integer;

sensing a feature difference value $\Delta C(i, j)$, where C is a capacitance, current or voltage, between the j-th sensing electrode within the sensing electrodes and another neighbouring sensing electrode during providing the driving signal to the i-th scan electrode, wherein j is an integer;

sensing a feature difference value $\Delta Ci$, where Ci is a capacitance, current or voltage, between the k-th sensing electrode within the sensing electrodes and a reference feature value during providing the driving signal to the i-th scan electrode, wherein k is an integer;

setting the feature value of a base sensing point within a plurality of sensing points of the touch panel as a base feature value; and using the base feature value, the feature difference values $\Delta Ci$ and the feature difference values $\Delta C(i,j)$ to calculate the feature values of the sensing points, wherein the above-mentioned step of calculating the feature values of a plurality of sensing points of the touch panel comprises:

calculating $\Delta C[i]=\Delta Ci-\Delta C(i+1)$, wherein $\Delta C[i]$ represents the feature difference value between the i-th scan electrode and the (i+1)-th scan electrode;

if the base sensing point is located at the i-th row, using the base feature value to calculate $C(i+1,j)=C(i,j)-\Delta C[i]$ or $C(i-1,j)=C(i,j)+\Delta C[i]$, wherein $C(i,j)$ represents the feature value of the sensing point with the i-th column and the j-th row within the sensing points; and calculating $C(i,j+1)=C(i,j)-\Delta C(i,j)$ or $C(i,j-1)=C(i,j)+\Delta C(i,j)$.

2. The differential detection method of a touch panel as claimed in claim 1, wherein the feature value of the sensing points is capacitance value, current value or voltage value.

3. The differential detection method of a touch panel as claimed in claim 1, further comprising:
calculating the difference between the minimum feature value within the feature values of all the sensing points on the i-th scan line and the base feature value, and taking the difference as a compensation value; and
adjusting the feature values of all the sensing points on the i-th scan line according to the compensation value.

4. The differential detection method of a touch panel as claimed in claim 1, further comprising:
calculating an average feature value of all the sensing points on the i-th scan line;
calculating the difference between the average feature value and the base feature value, and taking the difference as a compensation value; and
adjusting the feature values of all the sensing points on the i-th scan line according to the compensation value.

5. The differential detection method of a touch panel as claimed in claim 1, wherein the step of sensing the feature difference value $\Delta Ci$ comprises:
sensing the feature difference value $\Delta Ci$ between the k-th sensing electrode and a dummy sensing electrode of the touch panel.

6. The differential detection method of a touch panel as claimed in claim 1, wherein the step of sensing the feature difference value $\Delta Ci$ comprises:
sensing the feature difference value $\Delta Ci$ between the k-th sensing electrode and a reference capacitor.

7. The differential detection method of a touch panel as claimed in claim 1, wherein the k-th sensing electrode mentioned in the step of sensing the feature difference value $\Delta Ci$ is an edge electrode within the sensing electrodes.

8. The differential detection method of a touch panel as claimed in claim 1, wherein in the step of selecting the i-th scan electrode within the scan electrodes, the next scan electrode is sequentially selected.

9. The differential detection method of a touch panel as claimed in claim 1, further comprising:
if within the sensing points, the feature value of a first sensing point is greater than the feature values of all the neighbouring sensing points adjacent to the first sensing point, deciding the first sensing point as a touch point.

10. A touch panel, comprising:
a first conductive layer;
a plurality of scan electrodes, disposed at a side of the first conductive layer along a first axial direction;
a second conductive layer;
a plurality of sensing electrodes, disposed at a side of the second conductive layer along a second axial direction; and
a controller, selecting the i-th scan electrode within the scan electrodes so as to provide a driving signal to the i-th scan electrode, wherein during providing the driving signal to the i-th scan electrode, the controller senses the feature difference value $\Delta C(i, j)$, where C is a capacitance, current or voltage, between the j-th sensing electrode within the sensing electrodes and another neighbouring sensing electrode; during providing the driving signal to the i-th scan electrode, the controller senses the feature difference value $\Delta Ci$, where Ci is a capacitance, current or voltage, between the k-th sensing electrode within the sensing electrodes and a reference feature value, the above-mentioned i, j and k are integers; the controller sets the feature value of a base sensing point within a plurality of sensing points of the touch panel as a base feature value; and the controller uses the base feature value, the feature difference values $\Delta Ci$ and the feature difference values $\Delta C(i,j)$ to calculate the feature values of the sensing points,
wherein the controller calculates $\Delta C[i]=\Delta Ci-\Delta C(i+1)$, wherein $\Delta C[i]$ represents the feature difference value between the i-th scan electrode and the (i+1)-th scan electrode; if the base sensing point is located at the j-th row, the controller uses the base feature value to calculate $C(i+1,j)=C(i,j)-\Delta C[i]$ or $C(i-1,j)=C(i,j)+\Delta C[i]$, wherein $C(i,j)$ represents the feature value of the sensing point with the i-th column and the j-th row within the sensing points; and the controller calculates $C(i,j+1)=C(i,j)-\Delta C(i,j)$ or $C(i,j-1)=C(i,j)+\Delta C(i,j)$.

11. The touch panel as claimed in claim 10, wherein the feature value of the sensing points is capacitance value, current value or voltage value.

12. The touch panel as claimed in claim 10, wherein the controller further calculates the difference between the minimum feature value within the feature values of all the sensing points on the i-th scan line and the base feature value, and takes the difference as a compensation value; and the controller adjusts the feature values of all the sensing points on the i-th scan line according to the compensation value.

13. The touch panel as claimed in claim 10, wherein the controller further calculates an average feature value of all the sensing points on the i-th scan line; the controller calculates the difference between the average feature value and the base feature value and takes the difference as a compensation value; and the controller adjusts the feature values of all the sensing points on the i-th scan line according to the compensation value.

14. The touch panel as claimed in claim 10, wherein the controller senses the feature difference value $\Delta Ci$ between the k-th sensing electrode and a dummy sensing electrode of the touch panel.

15. The touch panel as claimed in claim 10, wherein the controller senses the feature difference value $\Delta Ci$ between the k-th sensing electrode and a reference capacitor.

16. The touch panel as claimed in claim 10, wherein the k-th sensing electrode is an edge electrode within the sensing electrodes.

17. The touch panel as claimed in claim 10, wherein the controller sequentially selects the next scan electrode.

18. The touch panel as claimed in claim 10, wherein the controller further compares the feature values of the sensing points, if within the sensing points, the feature value of a first sensing point is greater than the feature values of all the sensing points adjacent to the first sensing point, the controller decides the first sensing point as a touch point.

19. The touch panel as claimed in claim 10, wherein at least one of the first conductive layer and second conductive layer is composed of carbon nanotube film.

20. The touch panel as claimed in claim 10, wherein second conductive layer is a indium tin oxide film.

21. The touch panel as claimed in claim 10, further comprising:
an insulating layer structure, disposed between the first conductive layer and the second conductive layer.

* * * * *